(12) United States Patent
Kasahara et al.

(10) Patent No.: US 8,026,316 B2
(45) Date of Patent: Sep. 27, 2011

(54) PROCESS FOR PRODUCING FLUORINATION-TREATED PERFLUOROPOLYMER

(75) Inventors: Nobuyuki Kasahara, Chiyoda-ku (JP); Noriaki Miyake, Chiyoda-ku (JP)

(73) Assignee: Asahi Glass Company, Limited, Tokyo (JP)

(*) Notice: Subject to any disclaimer, the term of this patent is extended or adjusted under 35 U.S.C. 154(b) by 123 days.

(21) Appl. No.: 12/616,873

(22) Filed: Nov. 12, 2009

(65) Prior Publication Data

US 2010/0063214 A1    Mar. 11, 2010

Related U.S. Application Data

(63) Continuation of application No. PCT/JP08/58791, filed on May 13, 2008.

(30) Foreign Application Priority Data

May 16, 2007    (JP) ................ 2007-130610

(51) Int. Cl.
*C08F 8/22* (2006.01)
(52) U.S. Cl. ..... 525/356; 429/314; 429/316; 525/326.4; 526/243; 526/250; 528/401
(58) Field of Classification Search .......... 525/356; 526/243, 250; 528/401; 429/314, 316
See application file for complete search history.

(56) References Cited

U.S. PATENT DOCUMENTS

| | | |
|---|---|---|
| 4,626,587 A | 12/1986 | Morgan et al. |
| 4,743,658 A | 5/1988 | Imbalzano et al. |
| 6,664,337 B2 * | 12/2003 | Hiraga et al. ........... 525/326.2 |
| 7,488,788 B2 * | 2/2009 | Kasahara et al. ........... 526/247 |
| 2003/0208005 A1 | 11/2003 | Hiraga et al. |
| 2008/0287609 A1 | 11/2008 | Kasahara et al. |

FOREIGN PATENT DOCUMENTS

| | | |
|---|---|---|
| JP | 50-121388 | 9/1975 |
| JP | 62-104822 | 5/1987 |
| JP | 04-189802 | 7/1992 |
| JP | 11-152310 | 6/1999 |
| JP | 2002-348315 | 12/2002 |
| JP | 2004-161921 | 6/2004 |
| JP | 2005-48121 | 2/2005 |
| JP | 2006-505680 | 2/2006 |
| JP | 2006-316174 | 11/2006 |
| JP | 2007-145005 | 6/2007 |
| WO | 2004-102714 | 11/2004 |
| WO | WO 2005/108437 A1 | 11/2005 |

* cited by examiner

*Primary Examiner* — Bernard Lipman
(74) *Attorney, Agent, or Firm* — Oblon, Spivak, McClelland, Maier & Neustadt, L.L.P.

(57) ABSTRACT

To provide a process for efficiently producing a perfluoropolymer having unstable terminal groups reduced. A process for producing a fluorination-treated perfluoropolymer, which comprises melting a thermoplastic perfluoropolymer to form strands and contacting the polymer strands with a fluorine gas. For fluorination-treatment of the perfluoropolymer, an apparatus 10 is used, which comprises a melt extruder 11 for melting and extruding the perfluoropolymer, a die 12 for forming the melt extruded polymer into continuous strands 1 and a fluorination tank 13 for contacting the continuous strands 1 with a fluorine gas.

18 Claims, 4 Drawing Sheets

PROCESS FOR PRODUCING FLUORINATION-TREATED PERFLUOROPOLYMER

This application is a continuation of PCT/JP08/58791 filed May 13, 2008.

TECHNICAL FIELD

The present invention relates to a process for producing a fluorination-treated perfluoropolymer.

BACKGROUND ART

A perfluoropolymer is used for coating of semiconductor production equipments or chemical plants, coating of electric cables or optical fibers, automobile components, and so on.

A perfluoropolymer immediately after obtained by polymerizing a perfluoromonomer, such as a perfluoro carbon, has unstable groups, such as —COOH groups, —CF=CF$_2$ groups, —COF groups, —CF$_2$H groups or —CH$_2$OH groups, in some of its molecular chain terminals (hereinafter referred to as unstable terminal groups). It has been known that a polymer having many such terminal groups is thermally unstable, and may cause foaming or generation of hydrofluoric acid at the time of shape forming, which results in failure in forming or corrosion of a die of a forming equipment.

Then, engineering techniques for stabilizing such unstable terminal groups have been studied and some proposals have been made. For example, pellets of PFA (a copolymer of tetrafluoroethylene with a perfluoro(alkyl vinyl ether)), terminals of which are stabilized by fluorine gas treatment, have been known (Patent Document 1). Regarding such pellets, if they are intended to be made into a composition with another material, the pellets keep their shape before melting, and thus mixing with another material tends to be insufficient.

And, it has been known that a perfluoropolymer having an aliphatic ring structure in its main chain is terminal-stabilized by fluorine gas treatment (Patent Document 2). That is a process wherein, at a high temperature of at least the glass-transition point, a polymer having a fluorinated aliphatic ring structure and unstable terminal groups derived from a polymerization initiator and/or a chain transfer agent, is directly contacted with fluorine gas to convert the unstable terminal groups into stable terminal groups. However, by this process, there is a problem that particles of the polymer will melt, and the resulting polymer becomes a solid plate, which is difficult to handle.

Also, it has been known that a sheet-shaped perfluoropolymer is terminal-stabilized by fluorine gas treatment (Patent Document 3).

In processes of treating these solid perfluoropolymers with fluorine gas, there are also problems as follows:

(i) It takes a few hours to raise or lower the temperature of a pressure-resistant reactor;

(ii) When a polymer sheet is to be melted and fluorinated, if the melted polymer sheet is thick, it takes a few hours to fluorinate the polymer sheet to the core;

(iii) When pellets are used, it also takes time to diffuse fluorine gas;

(iv) When the thickness of the polymer sheet is made to be thin to shorten the time for fluorination treatment, the amount of the perfluoropolymer which can be produced by one treatment will be less;

(v) Before a perfluoropolymer is withdrawn from a pressure-resistant reactor, fluorine gas is necessarily removed from the reactor, but it takes a long time to remove the fluorine gas from the pressure-resistant reactor and replace it with nitrogen gas; and (vi) It is a batch type process and fluorination treatment is not continuous.

Additionally, it has been known that, with regard to a soluble perfluoropolymer having an aliphatic ring structure in its main chain, a polymer dissolved in an inert solvent is fluorinated with fluorine gas (Patent Documents 4 and 5). However, with respect to this method, there are problems such that it cannot be applied to a perfluoropolymer which is not soluble to an inert solvent, the process is cumbersome and requires a high cost for treatment, wherein the polymer is necessarily dissolved in a solvent and the solvent is necessarily removed after the fluorination, and continuous processing is difficult and thus it is difficult to increase the productivity.

Patent Document 1: JP-A-62-104822
Patent Document 2: JP-A-4-189802
Patent Document 3: WO2004/102714 (Example 1 on page 9)
Patent Document 4: JP-A-11-152310
Patent Document 5: JP-A-2002-348315

DISCLOSURE OF THE INVENTION

Object to be Accomplished by the Invention

The present invention is to provide a process for efficiently producing a perfluoropolymer having unstable terminal groups reduced.

Means to Accomplish the Object

The present invention provides the following, whereby the above object is accomplished:

[1] A process for producing a fluorination-treated perfluoropolymer, which comprises melting a thermoplastic perfluoropolymer to form strands and contacting the polymer strands with a fluorine gas.

[2] The process for producing a fluorination-treated perfluoropolymer according to the above [1], wherein the thermoplastic perfluoropolymer is melted and extruded through a die into the strands.

[3] The process for producing a fluorination-treated perfluoropolymer according to the above [1] or [2], wherein the strands have a diameter of from 0.01 to 5 mm.

[4] The process for producing a fluorination-treated perfluoropolymer according to any one of the above [1] to [3], wherein the polymer strands are contacted with a fluorine gas at a temperature of from 150 to 380° C.

[5] The process for producing a fluorination-treated perfluoropolymer according to any one of the above [1] to [4], wherein the strands are contacted with a fluorine gas diluted to a concentration of from 1 to 50 volume % with an inert gas.

[6] The process for producing a fluorination-treated perfluoropolymer according to any one of the above [1] to [5], wherein the polymer strands are contacted in a melted state with a fluorine gas.

[7] The process for producing a fluorination-treated perfluoropolymer according to any one of the above [2] to [6], wherein the strands are extruded vertically downward through the die.

[8] The process for producing a fluorination-treated perfluoropolymer according to any one of the above [1] to [7], wherein the perfluoropolymer is a copolymer of tetrafluoroethylene with a perfluoro(alkyl vinyl ether).

[9] The process for producing a fluorination-treated perfluoropolymer according to any one of the above [1] to [7], wherein the perfluoropolymer is a polymer having a fluorinated aliphatic ring structure in its main chain.

[10] The process for producing a fluorination-treated perfluoropolymer according to the above [9], wherein the polymer having a fluorinated aliphatic ring structure in its main chain is a polymer obtained by cyclopolymerizing a perfluorodiene of the following formula (I):

$$CF_2=CR^8\text{-}Q\text{-}CR^9=CF_2 \qquad (1)$$

wherein each of $R^8$ and $R^9$ which are independent of each other, is a fluorine atom, a chlorine atom or a trifluoromethyl group, and Q represents a bivalent group.

[11] The process for producing a fluorination-treated perfluoropolymer according to any one of the above [1] to [10], wherein the perfluoropolymer is formed into continuous strands by a melt extruder having a die at its forward end, and then the continuous polymer strands are contacted with a fluorine gas.

[12] The process for producing a fluorination-treated perfluoropolymer according to the above [11], wherein an apparatus is used, which comprises a melt extruder for melting and extruding the thermoplastic perfluoropolymer, a die for forming the melt extruded polymer into continuous strands and a fluorination tank for contacting the continuous polymer strands with a fluorine gas.

Effects of the Invention

In the process for producing a fluorination-treated perfluoropolymer in the present invention, a thermoplastic perfluoropolymer is extruded to form strands, and the strands are contacted with a fluorine gas, whereby it takes a shorter time for fluorination treatment of the polymer than a conventional process wherein an agglomerated polymer or a sheet-shaped polymer is contacted with a fluorine gas. Additionally, the strands are provided continuously, and thus the polymer can be fluorination-treated continuously. As a result, a perfluoropolymer having unstable terminal groups reduced can be produced efficiently. By continuously withdrawing the perfluoropolymer having unstable terminal groups reduced, from the fluorination-treatment apparatus (fluorination tank), a perfluoropolymer having unstable terminal groups reduced, can be produced more efficiently.

In the process for producing a fluorination-treated perfluoropolymer of the present invention, a thermoplastic perfluoropolymer is extruded to form strands, and the strands are contacted with a fluorine gas. Therefore when the strands are contacted with a fluorine gas, there is no mechanically sliding part. That is, the process has an effect of reducing contamination from a material of a reaction equipment by mechanical sliding in a corrosive environment.

DESCRIPTION OF SYMBOLS

1: Strands
10: Apparatus for producing fluorination-treated perfluoropolymer
11: Melt extruder
12: Die
13: Fluorination tank
20: Apparatus for producing fluorination-treated perfluoropolymer
30: Apparatus for producing fluorination-treated perfluoropolymer
40: Apparatus for producing fluorination-treated perfluoropolymer

BEST MODE FOR CARRYING OUT THE INVENTION

In the present specification, a perfluoropolymer means a polymer which does not substantially have hydrogen atoms bonded to carbon atoms, and has fluorine atoms instead of the hydrogen atoms, wherein the main chain is a chain of carbon atoms. A side chain of the perfluoropolymer may have a multivalent atom other than a carbon atom, and the multivalent atom is preferably an oxygen atom. Some of the hydrogen atoms to be substituted by fluorine atoms may be substituted by chlorine atoms. The proportion of the number of the chlorine atoms is preferably at most 30%, particularly preferably at most 15%, to the total number of the fluorine atoms and the chlorine atoms. Additionally, the side chain may have a functional group which is inactive to fluorination.

The above perfluoropolymer may, for example, be a homopolymer or copolymer of at least one perfluoromonoene, a homopolymer or copolymer having at least one cylcopolymerizable perfluorodiene cyclopolymerized, or a copolymer of such a perfluorodiene with a perfluoromonoene. Hereinafter, the above perfluoromonoene and the above perfluorodiene are also called a perfluoromonomer. A perfluoromonomer is a monomer having no hydrogen atom, which may have a multivalent atom such as an oxygen atom, or may have a chlorine atom.

In the present specification, "to have a fluorinated aliphatic ring structure in its main chain" means to have a structure wherein at least one carbon atom constituting the aliphatic ring is a carbon atom in the carbon-atom chain of the main chain, and a fluorine atom or a fluorine-containing group is bonded to at least a part of carbon atoms constituting the aliphatic ring. The aliphatic ring is preferably a four- to seven-membered ring consisting of carbon atoms and at least one oxygen atom, more preferably a five- or six-membered ring having one or two oxygen atoms. Carbon atoms constituting a main chain of a polymer are, in a repeating unit based on a monoene, the two carbon atoms of the unsaturated group of the monoene, and, in a repeating unit of based on a cyclopolymerizable diene, the four carbon atoms of the two unsaturated groups of the diene.

The perfluoropolymer of the present invention is required to have a thermoplastic property. The thermoplastic property is a property whereby the polymer can be melted and fluidized by heating, and can be formed into e.g. strands. A thermoplastic perfluoropolymer is generally a linear polymer, but it may have a few cross-links so long as it has the thermoplastic property. Nevertheless, a homopolymer of tetrafluoroethylene does not usually have the thermoplastic property.

The homopolymer or copolymer of the perfluoromonoene is preferably a copolymer of tetrafluoroethylene (TFE), particularly preferably a copolymer of tetrafluoroethylene with a perfluoro(alkyl vinyl ether), i.e. PFA, or a copolymer of tetrafluoroethylene with hexafluoroethylene, i.e. FEP. Particularly, a copolymer of tetrafluoroethylene with a perfluoro (alkyl vinyl ether) is preferred.

With regard to the copolymer of tetrafluoroethylene with a perfluoro(alkyl vinyl ether), the perfluoro(alkyl vinyl ether) as a monomer is preferably a perfluoro(alkyl vinyl ether) represented by the formula: $R^f$—O—CF=CF$_2$ (wherein $R^f$ is a $C_{2-8}$ perfluoroalkyl group, which may have an etheric oxygen atom). $R^f$ more preferably has from 3 to 5 carbon atoms.

$R^f$ may, for example, be CF$_3$, CF$_3$CF$_2$, CF$_3$CF$_2$CF$_2$, (CF$_3$)$_2$CF, CF$_3$CF$_2$CF$_2$CF$_2$, CF$_3$CF$_2$CF$_2$CF$_2$CF$_2$, CF$_3$OCF$_2$, CF$_3$OCF$_2$CF$_2$, CF$_3$CF$_2$OCF$_2$, CF$_3$OCF$_2$OCF$_2$, CF$_3$CF$_2$OCF$_2$CF$_2$, CF$_3$CF$_2$OCF(CF$_3$)CF$_2$ or CF$_3$CF$_2$CF$_2$OCF(CF$_3$)CF$_2$.

With regard to the copolymer of tetrafluoroethylene with a perfluoro(alkyl vinyl ether), one type of perfluoro(alkyl vinyl ether) may be used alone, or two or more types may be used in combination. And, another perfluoro monomer other than tetrafluoroethylene or a perfluoro(alkyl vinyl ether) may be copolymerized with them. Such another perfluoromonomer may, for example, be hexafluoropropylene or chlorotrifluoroethylene. The copolymerization ratio of tetrafluoroethylene to a perfluoro(alkyl vinyl ether) is preferably from 99.9/0.1 to 95/5, more preferably from 99.7/0.3 to 97/3, by molar ratio of repeating units based on tetrafluoroethylene/repeating units based on a perfluoro(alkyl vinyl ether).

The perfluoropolymer of the present invention is preferably a homopolymer or copolymer having a fluorinated aliphatic ring structure in its main chain. The repeating units having a fluorinated aliphatic ring structure in its main chain is formed by polymerization of a cyclic perfluoromonoene (hereinafter referred to as a cyclic monomer) having a polymerizable unsaturated group in its aliphatic ring or by cyclopolymerization of a cyclopolymerizable diene. With regard to a cyclic monomer, "to have a polymerizable unsaturated group" means that a polymerizable unsaturated group consists of two carbon atoms to constitute the aliphatic ring, or a polymerizable unsaturated group consists of a carbon atom to constitute the aliphatic ring and a carbon atom not to constitute the aliphatic ring.

A polymer having a fluorinated aliphatic ring structure in its main chain, which is obtained from a cyclic monomer, is disclosed in e.g. the above Patent Documents 2, 4 and 5, JP-B-64-18964, JP-A-07-316235. That is, such a polymer is obtained by homopolymerizing a cyclic monomer such as perfluoro(2,2-dimethyl-1,3-dioxole), perfluoro(4-methoxy-1,3-dioxole) or perfluoro(2-methylene-1,3-dioxolane). A copolymer having a fluorinated aliphatic ring structure in its main chain is obtained by copolymerizing such a monomer with a copolymerizable monomer such as tetrafluoroethylene, chlorotrifluoroethylene or perfluoro(methyl vinyl ether). The proportion of repeating units of a cyclic monomer in the copolymer is preferably at least 30 mol %, particularly preferably at least 50 mol %, in all repeating units.

The cyclic monomer may, for example, be a compound of the following formula (1), (2) or (3):

(1)

(2)

(3)

wherein each of $R^1$ to $R^7$ which are independent of one another, is F, Cl, a perfluoroalkyl group having at most 4 carbon atoms or a perfluoroalkoxy group having at most 4 carbon atoms, and $R^2$ and $R^3$, $R^4$ and $R^5$, and $R^6$ and $R^7$ may be joined to form a $C_{2-4}$ perfluoroalkylene group.

$R^1$ is preferably a fluorine atom, a trifluoromethyl group or a trifluoromethoxy group, and each of $R^2$ and $R^3$ which are independent of each other, is preferably a fluorine atom or a trifluoromethyl group. Each of $R^4$ to $R^7$ which are independent of one another, is preferably a fluorine atom or a trifluoromethyl group.

The polymer having a fluorinated aliphatic ring structure in its main chain is also obtained by cyclopolymerization of a cyclopolymerizable perfluorodiene. A cyclopolymerizable diene generally has a polymerizable double bond at each of the two terminals of the molecule of a linear compound, and has a structure wherein there is a proper distance (which can be represented by a number of atoms such as carbon atoms or oxygen atoms) between the two polymerizable double bonds. The distance is properly from 2 to 5 by the number of atoms, particularly preferably 2 or 3. The number of atoms, which represents such a distance, does not include the number of side chains. The atoms between the two polymerizable double bonds preferably consist of carbon atoms and oxygen atoms.

A cyclopolymerizable diene or its polymer is disclosed in e.g. the above Patent Documents 2, 4 and 5, JP-A-63-238111, JP-A-63-238115. The cyclopolymerizable diene may, for example, be perfluoro(allyl vinyl ether) or perfluoro(butenyl vinyl ether). Its polymer may, for example, be a homopolymer or copolymer thereof, or a copolymer of at least one of such dienes with another copolymerizable monomer. The copolymerizable monomer may, for example, be tetrafluoroethylene, chlorotrifluoroethylene, a linear monoene such as perfluoro(methyl vinyl ether) or the above cyclic monomer such as perfluoro(2,2-dimerhyl-1,3-dioxole), perfluoro(4-methoxy-1,3-dioxole) or perfluoro(2-methylene-1,3-dioxolane). The proportion of the repeating units of cyclopolymerized dienes in the copolymer is properly at least 30 mol %, preferably at least 50 mol %, in all repeating units.

The cyclopolymerizable perfluorodiene is preferably a compound of the following formula (4):

CF$_2$=CR$^8$-Q-CR$^9$=CF$_2$ (4)

In the formula (4), each of $R^8$ and $R^9$ which are independent of each other, is preferably a fluorine atom, a chlorine atom or a trifluoromethyl group, particularly preferably a fluorine atom. Q is preferably a perfluoroalkylene group, a perfluorooxyalkylene group (a perfluoroalkylene group having an oxygen atom at its one terminal) or a perfluorodioxyalkylene group (a perfluoroalkylene group having an oxygen atom at each terminal), and the number of the carbon atoms and oxygen atoms thereof except for the side chains (the number corresponding to the above distance between the two polymerizable double bonds) is preferably 2 or 3. The side chain is preferably a perfluoroalkyl group, and the number of carbon atoms of Q including the side chain is preferably from 2 to 6. Some of fluorine atoms of Q may be substituted by chlorine atoms, and the number of chlorine atoms is preferably fewer than the number of fluorine atoms.

The polymer having a fluorinated aliphatic ring structure in its main chain is preferably a polymer obtained by cyclopolymerizing the perfluorodiene of the formula (4).

When the perfluorodiene of the above formula (4) is cyclopolymerized, repeating units of the following formulae (4-1) to (4-3) are considered to be produced:

(4-1)

(4-2)

(4-3)

The perfluorodiene of the above formula (4) may, for example, be $CF_2=CFOCF_2CF_2CF=CF_2$, $CF_2=CFOCCl_2CF_2CF=CF_2$, $CF_2=CFOCF_2CF_2CCl=CF_2$, $CF_2=CFOCF_2CFClCF=CF_2$, $CF_2=CFOCF_2CF(CF_3)CF=CF_2$, $CF_2=CFOCF_2CF(CF_3)CCl=CF_2$, $CF_2=CFOCF_2CF=CF_2$, $CF_2=CFOCF(CF_3)CF=CF_2$, $CF_2=CFOCF_2OCF=CF_2$, $CF_2=CClOCF_2OCCl=CF_2$, $CF_2=CFOCCl_2OCF=CF_2$, or $CF_2=CFOC(CF_3)_2OCF=CF_2$.

The polymer having a fluorinated aliphatic ring structure in its main chain is particularly preferably a polymer obtained by cyclopolymerizing perfluoro(butenyl vinyl ether), $CF_2=CFOCF_2CF_2CF=CF_2$.

The process for producing a fluorination-treated perfluoropolymer of the present invention is a process for producing a fluorination-treated perfluoropolymer wherein the above thermoplastic perfluoropolymer is melted and formed into strands, and the polymer strands are contacted with a fluorine gas. The polymer strands are contacted preferably in a melted state with a fluorine gas, but the state of contact is not so limited. Solid strands may be produced by the melt spinning method and immediately fluorinated, or, after the production of solid strands, they may be fluorinated in another operation. In the present invention, it is preferred that a perfluoropolymer is formed into continuous strands by a melt extruder which has a die at its forward end, and then the continuous polymer strands are contacted with a fluorine gas.

In the present invention, it is preferred that a melted perfluoropolymer is permitted to flow down in a strand shape in a melted state, and then the flowing melted polymer in a strand shape is contacted with a fluorine gas. The melted polymer extruded downward through the pores of the die usually falls in a strand shape, while its diameter is reduced by the tension by its own weight. The polymer strands may be in a melted state even after the completion of the fluorination treatment. In such a case, the melted polymer after the completion of the fluorination treatment accumulates at the bottom of the fluorination-treatment apparatus. Then, in this case, the accumulated polymer is easily withdrawn from the fluorination-treatment apparatus. In order to carry out the fluorination treatment of the polymer in a melted state, the internal atmosphere of the fluorination-treatment apparatus is preferably kept at a temperature of at least the melting point (or the glass-transition point) of the polymer. To carry out the fluorination at such a temperature is preferred also because the fluorination reaction proceeds at a sufficiently high rate. After the fluorination treatment, the melted polymer can be immediately formed into pellets or particles. Or, the melted polymer may be once solidified, and then re-melted and formed.

In the present invention, solid strands of the perfluoropolymer, which are not in a melted state, can be fluorination-treated by being contacted with a fluorine gas. If the melting point (or the glass-transition point) of the perfluoropolymer is high and the temperature of the internal atmosphere of the fluorination-treatment apparatus is lower than the melting point (or the glass-transition point) of the polymer, the polymer strands extruded through the die are considered to be contacted with a fluorine gas, while becoming solidified in the fluorination-treatment apparatus. The polymer extruded though the die is considered to sometimes become solid strands of the polymer immediately after the extrusion. In such a case, the polymer can be fluorine-treated, while giving a tension to the strands and then pulling them out, in the same manner as in the melt spinning method. To produce strand polymer products is not the primary objective of the present invention, and so the shape of the perfluoropolymer after fluorination treatment is not necessarily a strand. For example, the strand after the fluorination treatment can be re-melted and withdrawn from the treatment apparatus. And, the strand after fluorination treatment can be subsequently re-melted and formed into various shapes.

The diameter of the strands is, at the finest portion (usually near the bottom of the fluorination-treatment apparatus), preferably from 0.01 to 5 mm, more preferably from 0.05 to 1 mm, most preferably from 0.1 to 0.3 mm. If the diameter of the strands is smaller than the above, the strands are more likely to be cut off during the treatment. If the diameter of the strands is larger than the above, the contacting time with the fluorine gas needs to be longer in order to reduce the unstable terminal groups sufficiently, so that the production efficiency is tends to be low. When the diameter of the strands is in the above range, the diffusion distance of the fluorine gas is short enough to fluorinate the unstable terminal groups sufficiently in a short time.

In order to obtain such a diameter of the strands, the diameter of the pores of the die is preferably from 0.5 to 5 mm, particularly preferably from 1 to 3 mm. When the pore diameter is at least 0.5 mm, the strands are less likely to be cut off. When the pore diameter is at most 5 mm, the strands do not become too thick. The strands of the melted polymer extruded through the die flow down, while reducing their diameters. The diameter of the strands solidified at the downstream basin can be made smaller by withdrawing them while giving a tension to the strands.

The die may have just one pore, but it preferably has plural pores. The more pores the die has, the more efficiently the perfluoropolymer is treated. To treat the same amount, it is efficiently treated by making the pore diameter smaller and increasing the number of the strands rather than by making the pore diameter larger. However, if the density of the pores is too high, there is a possibility that the strands will contact with one another and that the contact of the strands with a fluorine gas is affected. The interval of the pores (the distance between two outer diameters) is at least the inner diameter of the pores. Thus, the number of the pores of the die, which may be set properly depending on e.g. the inner diameter of the fluorination tank, is usually preferably from about 2 to 10. The diameter of the pores of die 12 is preferably from 0.5 to 5 mm, more preferably from 1 to 4 mm, most preferably from 1 to 3.5 mm. When the diameter of the pores of the die is in the above range, the strands may be stably formed, and the strands may be stably supplied to the fluorination-treatment apparatus.

In order to increase the efficiency of fluorination, it is preferred to properly adjust the melt viscosity of the polymer at the temperature at the time of passing through the die. Such a melt viscosity is preferably from 1,000 to 7,000 Pa·sec. When the melt viscosity is too high, the extrusion of the polymer possibly becomes difficult. When the melt viscosity is too low, there is possibility that the strands fall too rapidly and the contacting time with the fluorine gas will be short, and thus the fluorination of the unstable terminal groups becomes insufficient.

The formed strands are contacted with a fluorine gas in the fluorination-treatment apparatus. The fluorination-treatment apparatus is preferably a cylindrical apparatus standing almost vertically. In order to continuously fluorinate the strands extruded through the die, it is preferred that the cylindrical apparatus is attached to the end of the die and then the strands extruded through the die are made to move in the cylinder. That is, it is preferred that the strands are extruded downward through the die, the strands extruded through the die flow down in the cylinder, and the strands are contacted with a fluorine gas in the cylinder. Hereinafter, the cylindrical fluorination-treatment apparatus is also called the fluorination tank.

The temperature at which the strands are contacted with a fluorine gas (the temperature in the fluorination apparatus) is properly from 120 to 450° C. and at most the decomposition temperature of the perfluoropolymer. Particularly, when a general thermoplastic perfluoropolymer is used, the temperature is preferably from 150 to 380° C. When the temperature is too low, the reaction rate tends to be insufficient. When the temperature is too high, the perfluoropolymer is likely to be altered.

The fluorine gas can be used without dilution, but highly concentrated fluorine gas is difficult to handle, and it possibly causes corrosion of the apparatus or alteration of the perfluoropolymer. Therefore, the fluorine gas is preferably diluted with an inert gas such as nitrogen gas. The fluorine concentration in the diluted fluorine gas is preferably from 1 to 50 volume %, more preferably from 3 to 35 volume %, most preferably from 3 to 25 volume %. When the fluorine gas concentration is too low, fluorination of the unstable terminal groups tends to be insufficient. By contrast, when the fluorine gas concentration is too high, the polymer will be possibly decomposed in the fluorination process, and the fluorine gas use efficiency decreases. When the fluorine concentration is in the above range, the unstable terminal groups are efficiently fluorinated and will be converted to stable terminal groups. The pressure of the fluorination-treatment atmosphere is preferably at most 1 MPa (in gauge pressure), more preferably from 0 to 0.5 MPa.

The fluorine gas is absorbed and diffused in the perfluoropolymer strands, thereby to react with the unstable terminal groups. The inert gas for dilution, such as nitrogen, will also be dissolved in the polymer, but is considered not to interfere with the reaction. Also, the inert gas is considered not to remain in the strand as bubbles, and thus not to decrease the degassing efficiency. By contrast, when the polymer is contacted with the gas in the extruder or when the polymer is contacted with the gas under pressure, bubbles of the gas are likely to be finely dispersed in the polymer, whereby it may take a long time for the degassing.

The contacting time of the perfluoropolymer strands with the fluorine gas is preferably from 1 to 15 minutes, more preferably from 5 to 15 minutes. If the contacting time is too short, it tends to be difficult to sufficiently fluorinate the unstable terminal groups. The contacting time of over 15 minutes has no problem, but at most 15 minutes is preferred from the viewpoint of treatment efficiency. The contacting time is obtained in such a manner that the linear speed (m/sec) of the die is calculated by dividing the amount for treatment (mL/min) by the total area of pores in the die, followed by dividing the contacting length of the strand with the gas (the length of the strand-length direction in the fluorination apparatus) by the linear speed.

Also, the present invention is a process for producing a fluorination-treated perfluoropolymer, wherein an apparatus for producing a fluorination-treated perfluoropolymer suitably adapted for the fluorination treatment, as described above, is used. That is, the present invention is a process for producing a perfluoropolymer wherein an apparatus is used, which has a melt extruder for melting and extruding the thermoplastic perfluoropolymer, a die for forming the melt extruded polymer into continuous strands and a fluorination tank for contacting the continuous polymer strands with a fluorine gas. This production apparatus will be described below, including a specific description of the above production process.

The melt extruder may, for example, be a single screw extruder, a twin screw extruder, a conical feeder or a gear pump, and is preferably a single screw extruder from a viewpoint of stable extruding of the melted polymer.

The fluorination tank is an example of the above fluorination-treatment apparatus. The fluorination tank is preferably a cylindrical tube standing almost vertically. This cylindrical tube is preferably directly connected to the die, so that the strands are extruded from the die into this cylindrical tube. The cylindrical tube is provided with an inlet and an outlet, and, the fluorine gas is supplied from a supply pipe attached to the inlet, and is discharged from a discharge pipe. The fluorination-treated perfluoropolymer accumulates at the bottom of the cylindrical tube. Therefore, a polymer withdrawing apparatus is preferably installed at the bottom of the cylindrical tube for withdrawing the polymer intermittently or continuously. In some cases, the polymer strands can be continuously withdrawn as they are, from the cylindrical tube. For this purpose, a sealing means is usually needed at the bottom of the cylindrical tube for preventing leakage of the fluorine gas.

The diameter of the above cylindrical tube is preferably from 50 to 300 mm, more preferably from 100 to 250 mm, most preferably from 150 to 250 mm. When the diameter is in the above range, the contact efficiency of the strands with the fluorine gas is excellent, and thus the strands are fluorinated efficiently. The fluorination tank is preferably a cylindrical tube from the viewpoint of a pressure-resistant reactor, but is not limited thereto. The length of the cylindrical tube is preferably from 300 to 1,700 mm, more preferably from 500 to 1,500 mm, most preferably from 500 to 1,200 mm. When the length is in the above range, the strand, in a melted state of the polymer, droops without cut off in midstream. The contacting length with the fluorine gas can be made to be shorter than the length of the cylindrical tube by adjusting the position of the inlet and the outlet of the fluorine gas. In this case, the contacting length with the fluorine gas preferably corresponds to the length of the above cylindrical tube.

First Embodiment

Production Apparatus

Figure 1:
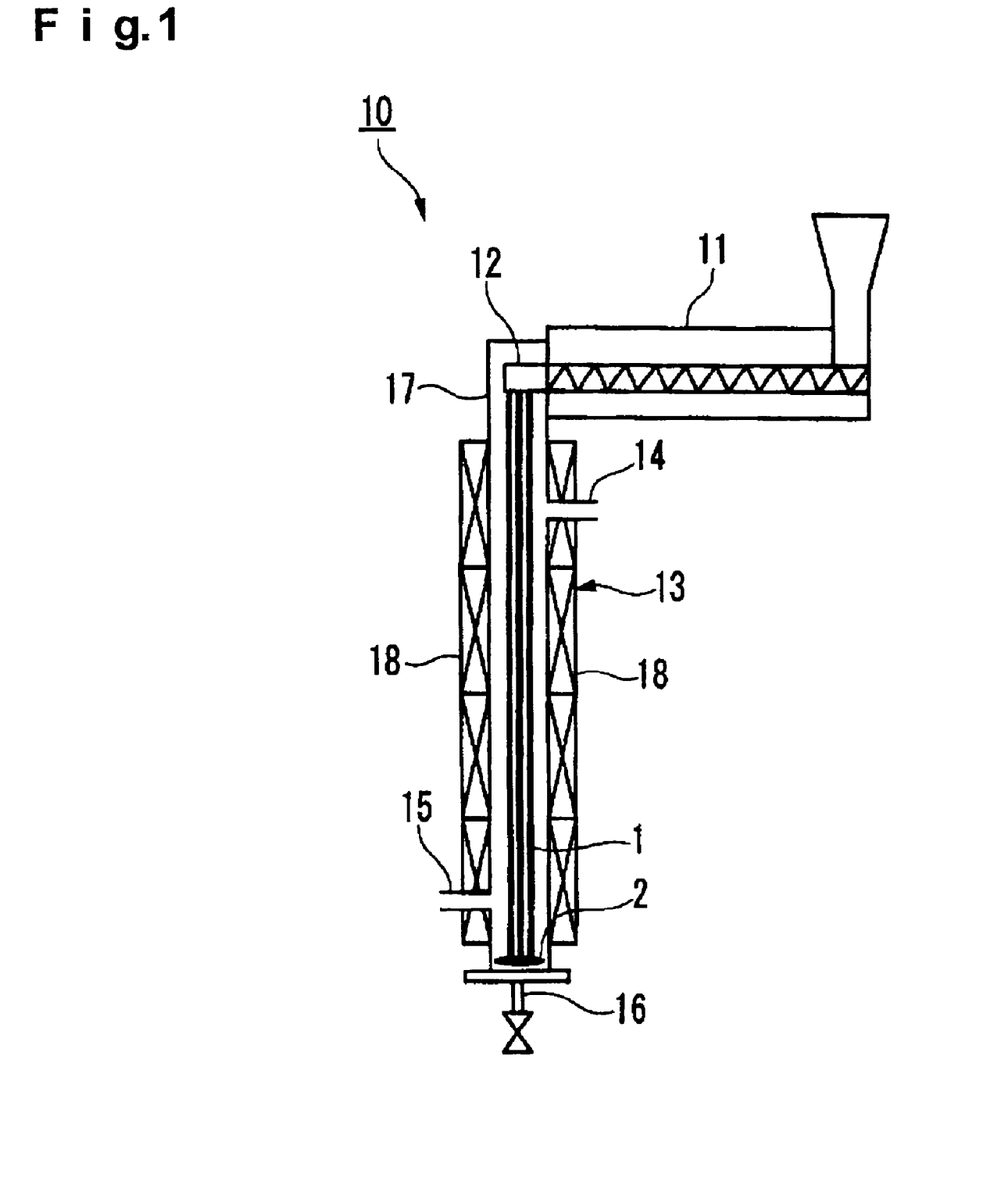
FIG. 1 is a schematic diagram showing an example of an apparatus for producing a fluorination-treated perfluoropolymer of the present invention.

FIG. 1 is a schematic diagram showing an example of an apparatus for producing a fluorination-treated perfluoropolymer of the invention. The production apparatus 10 comprises a melt extruder 11, a die 12 having plural pores, attached to the forward end of the melt extruder 11 and a fluorination tank 13 having the die 12 attached to its head. The melt extruder in FIG. 1 is an example of a single screw extruder.

The fluorination tank 13 is one composed of a vertical cylindrical tube 17 having a top portion to attach the die 12 at its head portion, a gas inlet 14 and a gas outlet 15 at its side and a polymer-withdrawing outlet 16 at its bottom, and a heater 18 attached on the circumference of the cylindrical tube 17. The material for the cylindrical tube is preferably nickel. Further, in FIG. 1, the gas inlet 14 is positioned at an upper portion of the fluorination tank 13 and the gas outlet 15 is positioned at a lower portion thereof, but such positions may be reversed. Namely, the gas inlet 14 may be positioned at a lower portion and the gas outlet 15 may be positioned at an upper portion of the fluorination tank 13.

Production Process

The production of a fluorination-treated perfluoropolymer by the production apparatus 10 is carried out as follows:

(i) A perfluoropolymer is melted by the melt extruder 11 and extruded into the die 12.

(ii) The extruded melted polymer is passed through the die 12 to form strands 1.

(iii) While the strands 1 flow down in the fluorination tank 13, the strands 1 are contacted with a fluorine gas.

(iv) The fluorination-treated perfluoropolymer 2 in a melted state accumulating at the bottom of the fluorination tank 13 is withdrawn from the polymer withdrawing outlet 16.

As shown in FIG. 1, the steps (i) to (iv) are continuously carried out by the production apparatus 10, which has the melt extruder 11, the die 12 and the fluorination tank 13 integrally connected in series for carrying out the respective steps.

Second Embodiment

Production Apparatus

Figure 2:
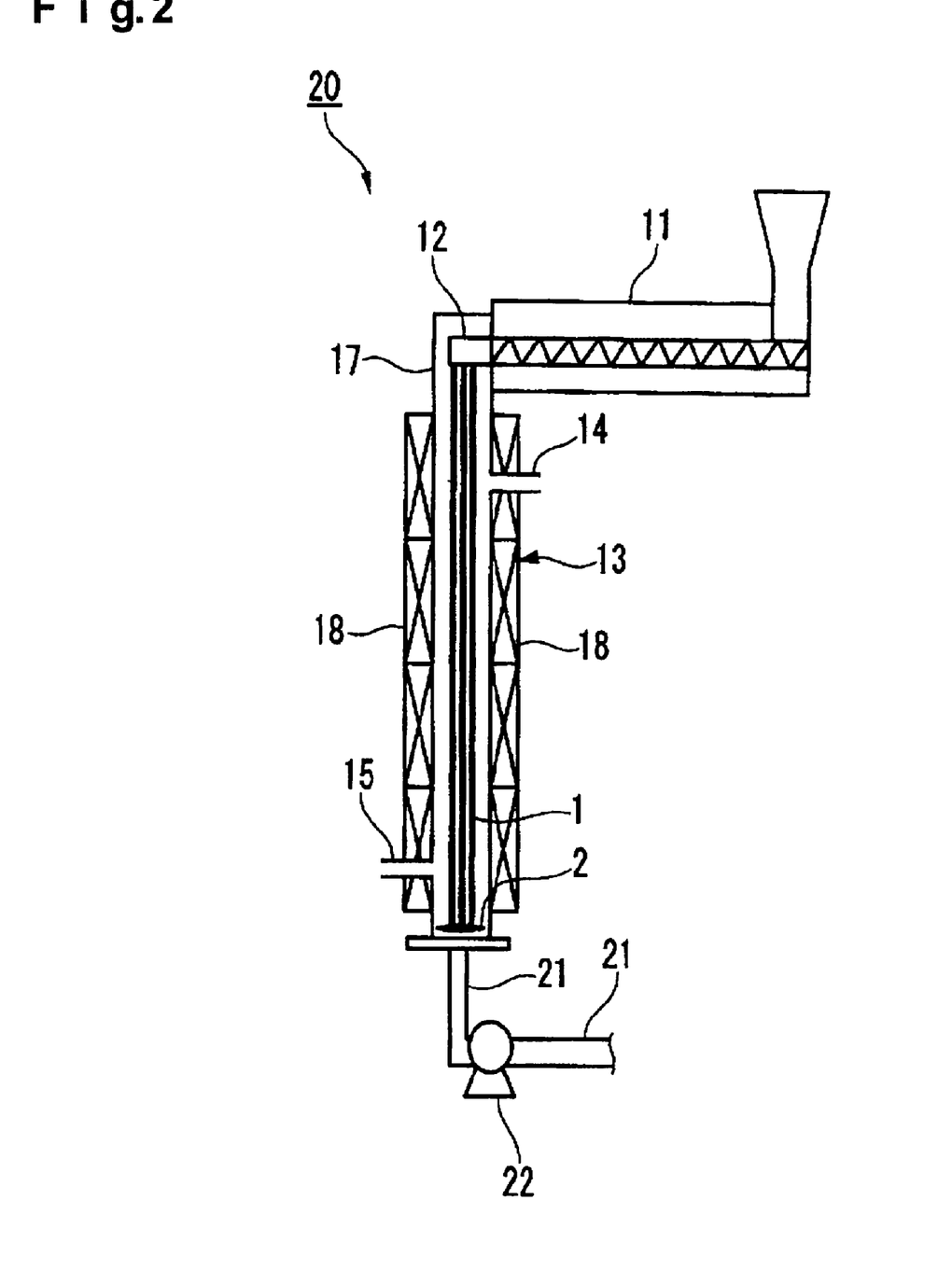
FIG. 2 is a schematic diagram showing another example of an apparatus for producing a fluorination-treated perfluoropolymer of the present invention.

FIG. 2 is a schematic diagram showing another example of an apparatus for producing a fluorination-treated perfluoropolymer of the invention. The production apparatus 20 comprises a melt extruder 11, a die 12 having plural pores, attached to the forward end of the melt extruder 11, a fluorination tank 13 having the die 12 attached to its head, a withdrawing pipe 21 connected to a polymer withdrawing outlet of the fluorination tank 13, and a pump 22 provided at a midway of the withdrawing pipe 21. As the extruder 11, the die 12 and the fluorination tank 13, the same ones as in First Embodiment are used.

The withdrawing pipe 21 is filled with the fluorination-treated perfluoropolymer 2, that is, sealed with the fluorination-treated perfluoropolymer 2 (material sealing) so that the fluorine gas in the fluorination tank 13 would not leak out through the withdrawing pipe 21.

The pump 22 may, for example, be a gear pump or a single screw extruder.

Production Process

The production of a fluorination-treated perfluoropolymer by the production apparatus 20 is carried out as follows:

Steps (i) to (iii) are carried out in the same manner as in First Embodiment.

(iv) In such a state that the withdrawing pipe 21 is sufficiently material-sealed with the fluorination-treated perfluoropolymer 2, the pump 22 is started to operate to continuously withdraw the fluorination-treated perfluoropolymer 2 from the withdrawing pipe 21.

As shown in FIG. 2, the steps (i) to (iv) are continuously carried out by the production apparatus 20, which has the melt extruder 11, the die 12, the fluorination tank 13, the withdrawing pipe 21 and the pump 22 integrally connected in series for carrying out the respective steps.

Third Embodiment

Production Apparatus

Figure 3:
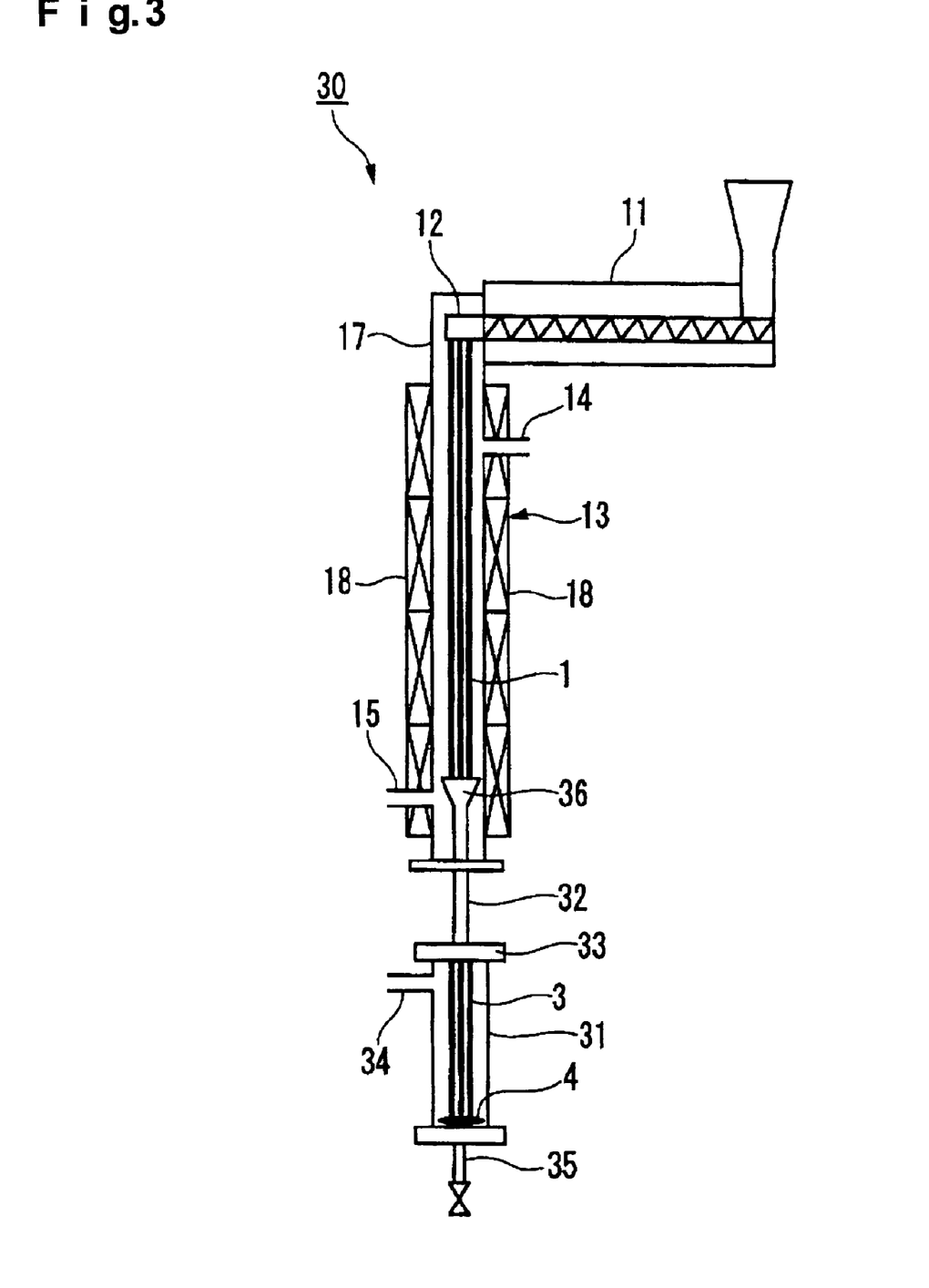
FIG. 3 is a schematic diagram showing another example of an apparatus for producing a fluorination-treated perfluoropolymer of the present invention.

FIG. 3 is a schematic diagram showing another example of an apparatus for producing a fluorination-treated perfluoropolymer of the invention. The production apparatus 30 comprises a melt extruder 11, a die 12 having plural pores, attached to the forward end of the melt extruder 11, a fluorination tank 13 having the die 12 attached to its head, a degassing tank 31, and a withdrawing pipe 32 having one end located in the fluorination tank 13 and the other end connected to the degassing tank 31.

As the extruder 11, the die 12 and the fluorination tank 13, the same ones as First Embodiment are used.

The degassing tank 31 has a die 33 having plural pores at its head, a degassing outlet 34 at its side and a polymer withdrawing outlet 35 at its bottom.

The withdrawing pipe 32 is a pipe having a polymer receiver 36 formed at its one end, and sealed with the fluorination-treated perfluoropolymer (material sealing) so that the fluorine gas in the fluorination tank 13 would not leak through the withdrawing pipe 32 to the degassing tank 31.

Production Process

The production of a fluorination-treated perfluoropolymer by the production apparatus 30 is carried out as follows:

Steps (i) to (iii) are carried out in the same manner as in First Embodiment.

(iv) In such a state that the withdrawing pipe 32 is sufficiently material-sealed with the fluorination-treated perfluoropolymer 2, the gas in the degassing tank 31 is degassed through the degassing outlet 34. The fluorination-treated perfluoropolymer is introduced into the degassing tank 31 by the pressure differential between the fluorination tank 13 and the degassing tank 31.

(v) The fluorination-treated perfluoropolymer is passed through the die 33 to form strands 3.

(vi) While the strands 3 flow down in the degassing tank 31, fluorine gas remaining in the strands 3 is degassed.

(vii) The fluorination-treated perfluoropolymer 4 accumulating at the bottom of the degassing tank 31 is withdrawn from the polymer withdrawing outlet 35.

As shown in FIG. 3, the steps (i) to (vii) are continuously carried out by the production apparatus 30, which has the melt extruder 11, the die 12, the fluorination tank 13, the withdrawing pipe 32 and the degassing tank 31 integrally connected in series for carrying out the respective steps.

The pressure in the degassing tank 31 is preferably lower by from 0.1 to 0.6 MPa (gauge pressure) than in the fluorination tank 13.

In case the fluorination-treated perfluoropolymer has a high viscosity and cannot be introduced into the degassing tank 31 by the differential pressure, a pump may be provided to the withdrawing pipe 32.

Fourth Embodiment

Production Apparatus

Figure 4:
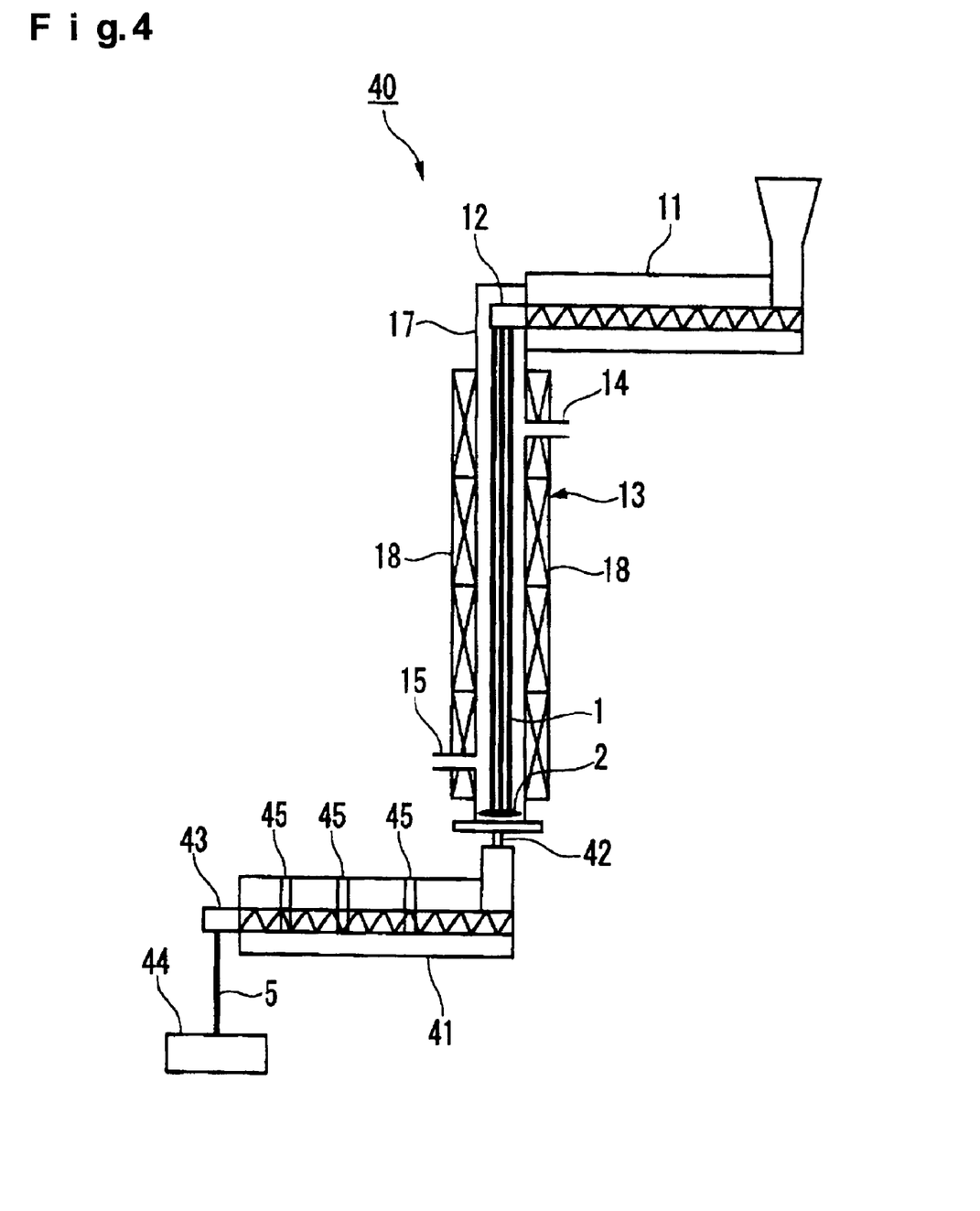
FIG. 4 is a schematic diagram showing another example of an apparatus for producing a fluorination-treated perfluoropolymer of the present invention.

FIG. 4 is a schematic diagram showing another example of an apparatus for producing a fluorination-treated perfluoropolymer of the invention. The production apparatus 40 comprises a melt extruder 11, a die 12 having plural pores, attached to the forward end of the melt extruder 11, a fluorination tank 13 having the die 12 attached to its head, a twin screw extruder 41, a withdrawing pipe 42, having one end connected to a polymer withdrawing outlet of the fluorination tank 13 and the other end connected to a polymer inlet of the twin screw extruder 41, a die 43 attached to the forward end of the twin screw extruder 41 and a pelletizer 44.

As the extruder 11, the die 12 and the fluorination tank 13, the same ones as in First Embodiment are used.

The twin screw extruder 41 has vent ports 45 for degassing the fluorination-treated perfluoropolymer 2.

The withdrawing pipe 42 is sealed with the fluorination-treated perfluoropolymer 2 (material sealing) so that the fluorine gas in the fluorination tank 13 would not leak trough the withdrawing pipe 42 to the twin screw extruder 41.

The die 43 is to form the fluorination-treated perfluoropolymer extruded through the twin screw extruder 41 into strands 5.

The pelletizer 44 is to cut the strands 5 to prepare pellets of the fluorination-treated perfluoropolymer.

Production Process

The production of a fluorination-treated perfluoropolymer by the production apparatus 40 is carried out as follows:

Steps (i) to (iii) are carried out in the same manner as in First Embodiment.

(iv) In such a state that the withdrawing pipe 42 is sufficiently material-sealed with the fluorination-treated perfluoropolymer 2, the twin screw extruder 41 is started to operate to introduce the fluorination-treated perfluoropolymer 2 into the twin screw extruder 41.

(v) While the fluorination-treated perfluoropolymer 2 is melted by the twin screw extruder 41, gas remaining in the fluorination-treated perfluoropolymer is degassed.

(vi) The fluorination-treated perfluoropolymer 2 extruded through the twin screw extruder 41 is passed through the die 43 to form strands 5.

(vii) The strands 5 are cut by the pelletizer 44 to obtain pellets of the fluorination-treated perfluoropolymer.

As shown in FIG. 4, the steps (i) to (vii) are continuously carried out by the production apparatus 40, which has the melt extruder 11, the die 12, the fluorination tank 13, the withdrawing pipe 42, the twin screw extruder 41 and the pelletizer 44 integrally connected in series for carrying out the respective steps.

The temperature for melting the fluorination-treated perfluoropolymer 2 (the temperature of the twin screw extruder) may be the same as the temperature for melting the polymer in the melt extruder 11.

EXAMPLES

Now, the present invention will be described in detail with reference to Examples. It should be understood, however, that the present invention is by no means limited to these Examples. As the method for measuring the volume flow rate and the method for analyzing terminal groups, the following methods are used.

Method for Measuring Volume Flow Rate

The volume flow rate was adopted as an index for the melt viscosity. The measuring method was such that using a Koka flow tester manufactured by Shimadzu Corporation, a copolymer was charged into a cylinder having an internal diameter of 11.3 mm, kept at a temperature of 380° C. for 5 minutes, and extruded through an orifice having an internal diameter of 2.1 mm and a length of 8 mm under a piston load of 7 kg, and the extrusion rate ($mm^3$/sec) at that time was taken as the volume flow rate. The larger the volume flow rate is, the lower the melt viscosity is.

Method for Analyzing Terminal Groups

Terminal groups were analyzed by using the method described in JP-A-62-104822.

Example 1

PFA

A copolymer of tetrafluoroethylene with perfluoro(propyl vinyl ether) (hereinafter referred to as the copolymer (A-1)) was prepared. The composition of the copolymer was tetrafluoroethylene/perfluoro(propyl vinyl ether)=98.5/1.5 (molar ratio), and its volume flow rate was 17.0.

As the apparatus for fluorination treatment of the copolymer (A-1), one having the construction as shown in FIG. 1 was used.

The copolymer (A-1) was melted at 370° C. by a single screw extruder (manufactured by Randcastle Extrusion Systems Inc., 12.7 mm in diameter) and extruded to a die at an extrusion rate of 2.7 g/min. The temperature at the connecting portion between the single screw extruder and the fluorination tank was 370° C. The extruded melted copolymer (A-1) was passed through three pores (3 mm in diameter) of the die to obtain strands. While the strands were permitted to descend in the fluorination tank having a volume of 15 L, the strands were brought into contact with a fluorine gas. In the fluorination tank, the temperature was 300° C. and the pressure was 0.2 MPa. To the fluorination tank, a mixed gas of 20 vol % of fluorine gas and 80 vol % of nitrogen gas was continuously supplied at 300 mL/min, and the gas in the fluorination tank was discharged so that the pressure in the fluorination tank would be constant. The strand diameter was 0.3 mm at the lowermost end of the strands.

The copolymer (A-1) was supplied to the fluorination tank for 30 minutes, and then the gas in the fluorination tank was discharged and replaced with nitrogen gas. After the temperature in the fluorination tank was lowered to room temperature, the fluorination-treated copolymer (A-1), accumulating at the bottom of the fluorination tank was withdrawn. The fluorination-treated copolymer (A-1) was formed into a film having a thickness of 250 μm at 350° C. by using a hot press. The number of the terminal groups in the film was measured by the method for analyzing terminal groups. As a result, the number of the terminal group —$CH_2OH$ was 0, and —COF was at most 1, in $10^6$ carbon atoms.

Example 2

PFA

A fluorination-treated copolymer (A-1) was obtained by the fluorination treatment of the copolymer (A-1) in the same manner as in Example 1 except that the extrusion rate was changed to 5.6 g/min. The strand diameter was 0.6 mm at the finest portion.

The obtained copolymer (A-1) was analyzed to measure the number of the terminal groups in the same manner as in Example 1. As a result, the number of the terminal group —$CH_2OH$ was 0, and —COF was at most 1.

Example 3 (Comparative Example)

PFA

The terminal groups of the copolymer (A-1) before the fluorination treatment were —$CH_2OH$ and —COF, and the number thereof in $10^6$ carbon atoms were 220 and 2, respectively.

Example 4 (Comparative Example)

35 g of perfluoro(butenyl vinyl ether) [PBVE], 150 g of ion-exchanged water and 90 g of $((CH_3)_2CHOCOO)_2$ as a polymerization initiator were charged into an autoclave made of pressure-resistant glass having an inner volume of 200 ml. The interior of the autoclave was replaced with nitrogen three times, and then they were suspension polymerized at 40° C. for 22 hours. As a result, 30 g of polyperfluoro(butenyl vinyl ether), a polymer having a number average molecular weight of $1.5 \times 10^5$ and having a fluorinated aliphatic ring structure in its main chain (hereinafter referred to as the polymer (B-1)), was obtained.

The intrinsic viscosity [η] of the polymer (B-1) in perfluoro (2-butyltetrahydrofuran) [PBTHF] at 30° C. was 0.50. The polymer (B-1) had a glass-transition point of 108° C. and was a tough, transparent and glasslike polymer at room temperature. Its 10% decomposition temperature was 465° C., and its refractive index was 1.34. The infrared absorption spectrum of a press-formed film of the polymer (B-1) (thickness: 200 μm) was measured, and a characteristic absorption of 1,883 $cm^{-1}$ derived from —COF groups was observed. The melt viscosity at 250° C. of the polymer (B-1) was 5,000 Pa·sec.

Example 5

Poly PBVE

Fluorination treatment of the polymer (B-1) was carried out with the production apparatus having the construction as shown in FIG. 1.

The polymer (B-1) was melted at 250° C. by a single screw extruder (manufactured by Randcastle Extrusion Systems Inc., 12.7 mm in diameter) and extruded to a die at an extrusion rate of 2.7 g/min. The temperature at the connecting portion between the single screw extruder and the fluorination tank was 250° C. The extruded melted polymer (B-1) was passed through three pores (3 mm in diameter) of the die to form strands. While the strands were permitted to descend in the fluorination tank having a volume of 15 L, the strands were brought into contact with a fluorine gas. In the fluorination tank, the temperature was 250° C. and the pressure was 0.2 MPa. To the fluorination tank, a mixed gas of 20 vol % of fluorine gas and 80 vol % of nitrogen gas was continuously supplied at 300 mL/min, and the gas in the fluorination tank was discharged so that the pressure in the fluorination tank would be constant. The strand diameter was 0.3 mm at the lowermost end of the strand. The infrared absorption spectrum of a press-formed film of the fluorination-treated polymer (B-1) (thickness: 200 μm) was measured, and the characteristic absorption of 1,883 $cm^{-1}$ derived from —COF groups was not observed.

Example 6

Poly PBVE

The apparatus having the construction as shown in FIG. 1 was used.

The polymer (B-1) was melted at 250° C. by a single screw extruder (manufactured by Randcastle Extrusion Systems Inc., 12.7 mm in diameter) and extruded to a die at an extrusion rate of 0.5 g/min. The temperature at the connecting portion between the single screw extruder and the fluorination tank was 250° C. The extruded melted polymer (B-1) was passed through three pores (1 mm in diameter) of the die to form strands. While the strands were permitted to descend in the fluorination tank having a volume of 15 L, the strands were brought into contact with a fluorine gas. In the fluorination tank, the temperature was 250° C. and the pressure was 0.2 MPa. To the fluorination tank, a mixed gas of 10 vol % of fluorine gas and 90 vol % of nitrogen gas was continuously supplied at 300 mL/min, and the gas in the fluorination tank was discharged so that the pressure in the fluorination tank would be constant. The strand diameter was 0.1 mm at the lowermost end of the strand. The infrared absorption spectrum of a press-formed film of the fluorination-treated polymer (B-1) (thickness: 200 μm) was measured, and the characteristic absorption of 1,883 $cm^{-1}$ derived from —COF groups was not observed.

Example 7

Poly PBVE

The apparatus having the construction as shown in FIG. 1 was used. The polymer (B-1) was melted at 250° C. by a single screw extruder (manufactured by Randcastle Extrusion Systems Inc., 12.7 mm in diameter) and extruded to a die at an extrusion rate of 1.0 g/min. The temperature at the connecting portion between the single screw extruder and the fluorination tank was 200° C. The extruded melted polymer (B-1) was passed through three pores (3 mm in diameter) of the die to form strands. While the strands were permitted to descend in the fluorination tank having a volume of 15 L, the strands were brought into contact with a fluorine gas. In the fluorination tank, the temperature was 200° C. and the pressure was 0.2 MPa. To the fluorination tank, a mixed gas of 20 vol % of fluorine gas and 80 vol % of nitrogen gas was continuously supplied at 300 mL/min, and the gas in the fluorination tank was discharged so that the pressure in the fluorination tank would be constant. The strand diameter was 0.1 mm at the lowermost end of the strand. The infrared absorption spectrum of a press-formed film of the fluorination-treated polymer (B-1) (thickness: 200 μm) was measured, and the characteristic absorption of 1,883 cm$^{-1}$ derived from —COF groups was not confirmed.

INDUSTRIAL APPLICABILITY

The perfluoropolymer obtained by the process for producing the fluorination-treated perfluoropolymer of the present invention has unstable terminal groups reduced and excellent thermal stability and is useful as a resin excellent in detachability from a substance and light transmittance. The perfluoropolymer obtained by the process of the present invention is useful for coating of semiconductor production equipments or chemical plants, coating of electric cables or optical fibers, automobile components, optical components such as optical fibers, lenses or optical cells or pellicles for semiconductor lithography.

The entire disclosure of Japanese Patent Application No. 2007-130610 filed on May 16, 2007 including specification, claims and summary is incorporated herein by reference in its entirety.

What is claimed is:

1. A process for producing a fluorination-treated perfluoropolymer with reduced chain terminal unstable functional groups, which comprises melting a thermoplastic perfluoropolymer to form strands and contacting the polymer strands with a gas comprising from 1 to 50 volume % of fluorine gas such that fluorine gas is absorbed and diffused into the polymer strands and is reacted with chain terminal unstable terminal groups throughout the polymer strands, thereby reducing the chain terminal unstable functional groups throughout the polymer strands.

2. The process for producing a fluorination-treated perfluoropolymer according to claim 1, wherein the thermoplastic perfluoropolymer is melted and extruded through a die into the strands.

3. The process for producing a fluorination-treated perfluoropolymer according to claim 1, wherein the strands have a diameter of from 0.01 to 5 mm.

4. The process for producing a fluorination-treated perfluoropolymer according to claim 1, wherein the polymer strands are contacted with a fluorine gas at a temperature of from 150 to 380° C.

5. The process for producing a fluorination-treated perfluoropolymer according to claim 1, wherein the strands are contacted with a fluorine gas diluted to a concentration of from 3 to 35 volume % with an inert gas.

6. The process for producing a fluorination-treated perfluoropolymer according to claim 1, wherein the polymer strands are contacted in a melted state with a fluorine gas.

7. The process for producing a fluorination-treated perfluoropolymer according to claim 2, wherein the strands are extruded vertically downward through the die.

8. The process for producing a fluorination-treated perfluoropolymer according to claim 1, wherein the perfluoropolymer is a copolymer of tetrafluoroethylene with a perfluoro (alkyl vinyl ether).

9. The process for producing a fluorination-treated perfluoropolymer according to claim 1, wherein the perfluoropolymer is a polymer having a fluorinated aliphatic ring structure in its main chain.

10. The process for producing a fluorination-treated perfluoropolymer according to claim 9, wherein the polymer having a fluorinated aliphatic ring structure in its main chain is a polymer obtained by cyclopolymerizing a perfluorodiene of the following formula (1):

$$CF_2=CR^8\text{-}Q\text{-}CR^9=CF_2 \quad (1)$$

wherein each of $R^8$ and $R^9$ which are independent of each other, is a fluorine atom, a chlorine atom or a trifluoromethyl group, and Q represents a bivalent group.

11. The process for producing a fluorination-treated perfluoropolymer according to claim 1, wherein the perfluoropolymer is formed into continuous strands by a melt extruder having a die at its forward end, and then the continuous polymer strands are contacted with a fluorine gas.

12. The process for producing a fluorination-treated perfluoropolymer according to claim 11, wherein an apparatus is used, which comprises a melt extruder for melting and extruding the thermoplastic perfluoropolymer, a die for forming the melt extruded polymer into continuous strands and a fluorination tank for contacting the continuous polymer strands with a fluorine gas.

13. The process for producing a fluorination-treated perfluoropolymer according to claim 1, wherein the strands are contacted with a fluorine gas diluted to a concentration of from 3 to 25 volume % with an inert gas.

14. The process for producing a fluorination-treated perfluoropolymer according to claim 1, wherein the diameter of the strands is 0.01 to 5 mm.

15. The process for producing a fluorination-treated perfluoropolymer according to claim 1, wherein the diameter of the strands is 0.05 to 1 mm.

16. The process for producing a fluorination-treated perfluoropolymer according to claim 1, wherein the diameter of the strands is 0.1 to 0.3 mm.

17. The process for producing a fluorination-treated perfluoropolymer according to claim 1, wherein the strands are contacted with the gas for 1 to 15 minutes.

18. The process for producing a fluorination-treated perfluoropolymer according to claim 1, wherein the strands are contacted with the gas for 5 to 15 minutes.

* * * * *